United States Patent [19]

Kudoh et al.

[11] Patent Number: 5,187,649
[45] Date of Patent: Feb. 16, 1993

[54] SOLID ELECTROLYTIC CAPACITOR AND METHOD FOR MANUFACTURING THE SAME

[75] Inventors: Yasuo Kudoh, Yokohama; Masao Fukuyama, Kawasaki; Toshikuni Kojima, Zama; Norishige Nanai, Atsugi, all of Japan

[73] Assignee: Matsushita Electric Industrial Co., Ltd., Osaka, Japan

[21] Appl. No.: 863,902

[22] Filed: Apr. 6, 1992

[30] Foreign Application Priority Data

Apr. 5, 1991 [JP] Japan .................................. 3-72870

[51] Int. Cl.⁵ .......................... H01G 9/00; B01J 17/00
[52] U.S. Cl. .................................... 361/525; 29/25.03
[58] Field of Search ........................... 361/523-527; 29/25.03

[56] References Cited

U.S. PATENT DOCUMENTS 4,858,078  8/1989  Morimoto et al. ................... 361/527
4,943,892  7/1990  Tsuchiya et al. ............... 29/25.03 X
4,959,753  9/1990  Kudoh et al. ........................ 361/525

FOREIGN PATENT DOCUMENTS 0416926   3/1991  European Pat. Off. .
62-181415  8/1987  Japan .
63-173313  7/1988  Japan .
2-119212   5/1990  Japan .

*Primary Examiner*—Donald A. Griffin
*Attorney, Agent, or Firm*—Lowe, Price, LeBlanc & Becker

[57] ABSTRACT

A solid electrolytic capacitor comprises a valve metal member having a dielectric oxide film and a conductive underlying layer formed on the member in this order, and a conductive polymer film formed on the layer. The conductive polymer film is formed by electrolytic polymerization of a polymerizable monomer contained in an aqueous solution containing a support electrolyte and a phosphate. By the presence of the phosphate in the aqueous solution, phosphate ions dissociated from the phosphate are adsorbed on the dielectric film during the course of the electrolytic polymerization. Thus, the humidity resistance of the dielectric oxide film is improved, resulting in improvements in the capacitance and loss of the capacitor under high temperature and high humidity conditions. A fabrication method of the capacitor is also described.

7 Claims, 1 Drawing Sheet

SOLID ELECTROLYTIC CAPACITOR AND METHOD FOR MANUFACTURING THE SAME

BACKGROUND OF THE INVENTION

1. Field of the Invention

This invention relates to a solid electrolytic capacitor which has good capacitor characteristics, particularly good high frequency characteristics, and high reliability under high temperature and high humidity conditions. The invention also relates to a method for manufacturing such a capacitor.

2. Description of the Prior Art

In recent years, digitalization in the electric and electronic fields has been conspicuous. This entails a strong demand for capacitors which exhibit a low impedance in a high frequency range and are small in size and large in capacitance.

Known capacitors which are used in high frequency ranges include, for example, plastic film capacitors, mica capacitors, layer-built ceramic capacitors and the like. These capacitors are disadvantageously so large in size that a large capacitance is difficult to obtain.

On the other hand, a certain type of electrolytic capacitor is known as having a large capacitance. This type of capacitor includes, for example, an aluminium dry electrolytic capacitor and an aluminium or tantalum solid electrolytic capacitor. These electrolytic capacitors are advantageous in that since an anodized film serving as a dielectric layer can be formed very thinly, a large capacitance can be realized. However, the anodized film is liable to undergo damages, so that it becomes necessary to provide an electrolyte between the anodized film and a cathode in order to repair the damages.

With aluminium dry electrolytic capacitors, anode and cathode aluminium foils which have been, respectively, etched, are convolutely wound through a separator and a liquid electrolyte is impregnated in the separator. This presents the problems that since the liquid electrolyte is ion conductive in nature with a large specific resistance, so that the loss (tan δ) becomes great with very poor frequency and temperature characteristics. In addition, the leakage and evaporation of the liquid electrolyte inevitably occurs, thus leading to a decrease of the capacitance and an increase of the loss with time.

With the tantalum solid electrolytic capacitor, manganese dioxide is used as the electrolyte. Accordingly, the problems on the temperature characteristic and the changes of the capacitance and loss in relation to the time can be overcome. However, the relatively high specific resistance of manganese dioxide results in the loss and a frequency characteristic of impedance poorer than those of the layer-built ceramic capacitors and film capacitors.

In order to solve the above problems, there have been recently proposed solid electrolytic capacitors wherein highly conductive polymers, which contain an anion of a support electrolyte as a dopant and which are obtained by electrolytically polymerizing heterocyclic monomers such as pyrrole, thiophene and the like, are formed on an anode through a conductive underlying layer (Japanese Kokai Patent Application Nos. 62-181415 and 63-173313). The solid electrolytic capacitor has good frequency and temperature characteristics.

However, the known solid electrolytic capacitors are liable to suffer degradation of the anodized oxide layer, e.g. an alumina layer, under high temperature and high humidity conditions. This will cause a lowering of the capacitance and an increase of the loss, making it difficult to obtain a stable capacitor which has high reliability.

SUMMARY OF THE INVENTION

It is therefore an object of the invention to provide a solid electrolytic capacitor which has improved capacitance and loss characteristics by preventing degradation of the dielectric oxide film formed on a valve metal.

It is another object of the invention to provide a solid electrolytic capacitor which is reliably worked over a long term under high temperature and high humidity conditions.

It is a further object of the invention to provide a method for fabricating a solid electrolytic capacitor of the type mentioned above.

According to one embodiment of the invention, there is provided a solid electrolytic capacitor which comprises a valve metal member having a dielectric oxide film and a conductive underlying layer formed thereon in this order, and a conductive polymer film which is formed by electrolytic polymerization of a polymerizable monomer. The invention is characterized in that the electrolytic polymerization is effected in an aqueous solution which comprises the polymerizable monomer, a support electrolyte and a phosphate. Because of the presence of the phosphate which is dissociated into phosphate ions in the aqueous solution, the phosphate ions are adsorbed on the dielectric oxide film during the course of the electrolytic polymerization. These ions can improve the humidity resistance of the dielectric oxide film. This eventually leads to the unlikelihood of suffering degradation of the capacitor characteristics under high temperature and high humidity conditions.

According to another embodiment of the invention, there is also provided a method for fabricating a solid electrolytic capacitor which comprises providing a valve metal member having a dielectric oxide film and a conductive underlying layer formed thereon, and subjecting the valve metal member to electrolytic polymerization in an aqueous solution which comprises a polymerizable monomer, a support electrolyte and a phosphate to form a conductive polymer film on the conductive underlying layer whereby phosphate ions dissociated from the phosphate are adsorbed on the dielectric oxide film.

BRIEF DESCRIPTION OF THE DRAWINGS

The sole FIGURE is a schematic sectional view of a solid electrolytic capacitor according to the invention.

DETAILED DESCRIPTION AND EMBODIMENTS OF THE INVENTION

Figure 1:
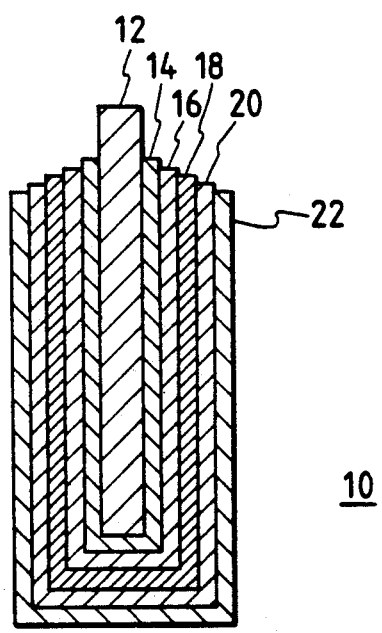

Reference is now made to the accompanying drawing wherein a solid electrolytic capacitor according to the invention is illustrated.

In the FIGURE, there is shown a capacitor unit 10. The unit 10 includes a valve metal member 12 having a dielectric film 14 and a conductive underlying layer 16 formed over the entire surface of the valve metal member 12. A conductive polymer film 18 is formed on the layer 16. Usually, a carbon layer 20 and a silver paste layer 22 are formed on the conductive polymer film 18. A lead for the anode and a lead for the cathode (both leads not shown) may be, respectively, attached to the valve metal member 12 and the silver paste layer 22, and the capacitor unit 10 may be encased in a resin casing to complete a solid electrolytic capacitor.

According to the invention, the conductive polymer film 18 is formed by electrolytic polymerization of polymerizable monomers. For the electrolytic polymerization, there is used an aqueous solution which comprises a polymerizable monomer, a support electrolyte and a phosphate dissolved in water. The present invention is characterized by the use of the phosphate in the aqueous solution for the electrolytic polymerization.

The phosphates used may be ones which are soluble in water and are capable of generating phosphate ions by dissociation in water. Typical examples of such phosphates include sodium primary phosphate, sodium secondary phosphate, sodium tertiary phosphate, potassium primary phosphate, potassium secondary phosphate, potassium tertiary phosphate, ammonium primary phosphate, ammonium secondary phosphate, ammonium tertiary phosphate and mixtures thereof. During the course of the electrolytic polymerization, the phosphate ions which are dissociated in the aqueous solution are adsorbed on the dielectric oxide film, by which the humidity resistance of the dielectric oxide film is significantly improved. For this purpose, the phosphate should preferably be contained in the aqueous solution in amounts of not less than 0.005 moles/liter. If the phosphate is used in larger amounts, a further improving effect cannot be expected.

The valve metal member is used in the form of a foil or a sheet as usual. Preferably, the foil or sheet is etched in order to increase the surface area of the foil or sheet. The valve metal may be tantalum or aluminium. The dielectric film is formed by anodization as is well known in the art and is specifically described in examples. The conductive underlying layer 16 may be made of materials which are formed as a thin film and have an electric conductivity to such an extent that the electrolytically polymerized film can grow from the thin film. Preferably, the layer 16 is made of manganese oxide which is formed by thermal decomposition of organic or inorganic manganese compounds, such as manganese nitrate, manganese acetate, manganese octylate, manganese naphthenate, manganese acetylacetone and the like.

The valve metal 12 on which the dielectric oxide film 14 and the conductive underlying layer 16 have been formed and attached is further formed with the conductive polymer film 18. The conductive polymer film is formed by electrolytic polymerization of a monomer contained in an aqueous electrolytic polymerization solution. The solution should contain a polymerizable monomer, a support electrolyte and a phosphate.

The monomers should be polymerizable and soluble in water and have an electric conductivity of not less than about $10^{-1}$ S/cm. Examples of such monomers include pyrrole or its derivatives having a substituent at the 3 and/or 4 or N position thereof, e.g. N-methylpyrrole. Besides, there may be further used water-soluble derivatives of thiophene, furan and the like, and aniline and derivatives thereof.

The support electrolytes may be ones which serve as a dopant for conductive polymers which have good film-forming properties and good chemical conversion properties for the valve metal and which have good heat and humidity resistances. Examples of the support electrolyte include, for example, inorganic compounds of anions such as $ClO^{4-}$, $BF^{4-}$ or $PF^{6-}$ and cations of ammonium, an alkali metal or the like, organic compounds such as aliphatic acids including formic acid, oxalic acid and the like and salts thereof, aromatic carboxylic acids and salts such as salicylic acid, benzoic acid and their salts, organic sulfonic acids such as toluenesulfonic acid, naphthalene sulfonic acid and their salts as is known in the art. Preferably, naphthalenesulfonates having at least one alkyl group having from 1 to 6 carbon atoms are used singly or in combination.

The aqueous solution for the electrolytic polymerization has generally a concentration of the polymerizable monomer of from 0.1 to 1 mole/liter, a concentration of the support electrolyte of from 0.01 to 0.5 moles/liter, and a concentration of the phosphate of not less than 0.005 moles/liter.

Fabrication of the solid electrolytic capacitor 10 is described.

The valve metal member 12 having an anode lead 20 is first provided. This member 12 is subjected to etching by any known procedure to increase the surface area. The etched foil is subsequently anodized by immersion in an aqueous acid solution to form the dielectric oxide film 14 on the surface of the member 12. The anodization is effected by an ordinary electrochemical procedure. The acid used for this purpose may be an inorganic acid such as phosphoric acid or an organic acid such as oxalic acid, adipic acid or the like. If the valve metal is aluminum, $Al_2O_3$ is formed on the foil surface. Alternatively, if tantalum is used, $Ta_2O_5$ is formed as the oxide film 14. The member 12 on which the anodized film 14 has been formed is immersed in an aqueous solution of, for example, a water-soluble manganese compound for a given time and dried in air at 200° to 400° C. thereby thermally decomposing the compound into manganese dioxide to form a manganese dioxide underlying layer 16 on the anodized film 14.

The conductive polymer film 18 is then formed on the conductive underlying layer 16. The valve metal member 12 is immersed in an electrolytic polymerization solution which comprises a polymerizable monomer, a support electrolyte and a phosphate. The potential for the polymerization is applied between a first electrode for the polymerization which contacts the conductive underlying layer 16 and a counter electrode kept away from the first electrode. As a result, a conductive polymer film is formed on the first electrode, from which the conductive polymer film gradually grows toward the manganese dioxide film. Finally, the conductive underlying layer 16 is fully covered with the conductive polymer film 18. The thickness of the film 18 is generally in the range of from 2 to 30 micrometers.

After the conductive polymer film 18 has fully covered the surface of the underlying layer 16 immersed in the solution, the polymerization reaction is stopped, followed by washing the polymer film 18 on the surface thereof to remove an unreacted monomer, the electrolyte and unstable oligomers. For the washing, a solvent which is easy to dry is used including, for example, water, alcohols, acetonitrile, ketones or the like.

A cathode lead (not shown) for the capacitor is attached to the conductive polymer film by means of a carbon paste or silver paste. The resultant capacitor unit 10 may be covered with a resin such as an epoxy resin. Finally, the covered element is aged, for example, by application of an appropriate potential at a normal temperature for several hours.

The present invention is more particularly described by way of examples.

EXAMPLE 1

A 8 mm wide×10 mm long aluminium etched foil was provided as a valve metal foil and was attached with an anode lead as shown in the figure. This foil was placed in a 3% ammonium adipate aqueous solution and anodized at about 70° C. by application of a potential of 35 volts to form a dielectric film thereon. Thereafter, the anodized aluminium film was immersed in a 30% manganese nitrate aqueous solution and heated at 250° C. for 10 minutes to form a thermally decomposed manganese oxide conductive layer to provide an anode. The anode foil was then contacted with an electrode for electrolytic polymerization which was made of a stainless steel covered with polypyrrole and was immersed in an aqueous electrolytic polymerization solution containing 0.3 moles/liter of pyrrole, 0.1 mole/liter of sodium mono-n-butylnaphthalenesulfonate (SMnBNS), 0.005/liter moles of sodium primary phosphate (SPP) and water. A potential of 3 volts was applied between the electrode for electrolytic polymerization and a counter electrode provided in a spaced relation to the electrode to form a conductive polypyrrole film on the manganese oxide layer. Thereafter, the electrode for the electrolytic polymerization was removed and the film was washed with water and dried. A cathode lead was attached on the polypyrrole film by application of a carbon paste and a silver paste. The above procedure was repeated to obtain 10 capacitor elements in total.

The respective capacitor elements were aged at 13 volts and subjected to measurements of a capacitance at 120 Hz and a loss at 120 Hz immediately after the aging and after 500 hours under conditions of 85° C. and 85%. The average values of the ten measurements are shown in Table appearing hereinafter.

COMPARATIVE EXAMPLE 1

The general procedure of Example 1 was repeated except that SPP was not added, thereby obtaining ten capacitors. These capacitors were evaluated in the same manner as in Example 1. The results are shown in the Table.

The comparison between the results of Example 1 and Comparative Example 1 reveal that the solid electrolytic capacitor of the example is less degraded in that of the comparative example when placed under conditions of 85° C. and 85% for 500 hours. This is considered to result from the presence of the sodium primary phosphate in the electrolytic polymerization solution.

EXAMPLE 2

The general procedure of Example 1 was repeated except that there was used, instead of SPP, sodium secondary phosphate (SSP) or sodium tertiary phosphate (STP) used in an amount of 0.005 moles/liter, thereby obtaining two types of capacitors. These capacitors were evaluated in the same manner as in Example 1. The results are shown in the table. From the table, it will seen that the capacitance and loss are not so degraded after standing under conditions of 85° C. and 85% for 500 hours.

EXAMPLE 3

The general procedure of Example 2 was repeated except that sodium secondary phosphate (SSP) was added in different amounts of 0.0005 moles/liter, 0.005 moles/liter, 0.05 moles/liter and 0.5 moles/liter, thereby obtaining ten capacitors for each amount. These capacitors were evaluated in the same manner as in Example 1. The results are shown in the table.

As will be apparent from the table, when the SSP is added in amounts of not less than 0.005 moles/liter, the degradation of the characteristics under conditions of 85° C. and 85% is only slight.

EXAMPLE 4

The general procedure of Example 2 was repeated except that there was used, instead of STP, 0.01 mole/liter of potassium secondary phosphate (PSP) or 0.1 mole/liter of ammonium secondary phosphate, thereby obtaining ten capacitors for each phosphate. These capacitors were evaluated in the same manner as in Example 1. The results are shown in the table.

As will be apparent from the table, when the SSP is added in amounts of not less than 0.005 moles/liter, the degradation of the characteristics under conditions of 85° C. and 85% is only slight irrespective of the type of cation.

EXAMPLE 5

The general procedure of Example 1 was repeated except that there were, respectively, used instead of sodium monomethylnaphthalenesulfonate (SMMNS), sodium dibutylnaphthalenesulfonate (SDBNS), sodium triisopropylnaphthalenesulfonate (STiPNS), and sodium mono-N-hexylnaphthalenesulfonate (SMnHNS), thereby obtaining ten capacitors for each sulfonate. These capacitors were evaluated in the same manner as in Example 1. The results are shown in the table.

As will be apparent from the table, the degradation of the characteristics under conditions of 85° C. and 85% is only slight irrespective of the type of naphthalenesulfonate when the sodium primary phosphate is added.

EXAMPLE 6

The general procedure of Example 1 was repeated except that there was used, instead of pyrrole, a mixture of 0.15 moles/liter of pyrrole and 0.15 moles/liter of N-methylpyrrole, thereby obtaining ten capacitors. These capacitors were evaluated in the same manner as in Example 1. The results are shown in the table.

As will be apparent from the table, similar results as in Example 1 were obtained.

TABLE

|  | Phosphate | Amount (moles) | Support Electrolyte | Initial Characteristic (120 Hz) | | Characteristics after 500 hours under conditions of 80° C./85% | |
|---|---|---|---|---|---|---|---|
|  |  |  |  | Capacitance ($\mu F$) | tan $\delta$ (%) | Capacitance ($\mu F$) | tan $\delta$ (%) |
| Ex. 1 | SPP | 0.005 | SMnBNS | 13.2 | 1.9 | 12.3 | 4.2 |
| Comp. Ex. 1 | — | — | " | 13.1 | 1.8 | 9.8 | 7.2 |

TABLE-continued

| | Phosphate | Amount (moles) | Support Electrolyte | Initial Characteristic (120 Hz) | | Characteristics after 500 hours under conditions of 80° C./85% | |
|---|---|---|---|---|---|---|---|
| | | | | Capacitance (μF) | tan δ (%) | Capacitance (μF) | tan δ (%) |
| Ex. 2 | SSP | 0.005 | " | 13.4 | 1.8 | 12.7 | 4.3 |
| | STP | 0.005 | " | 12.9 | 1.7 | 12.2 | 4.2 |
| Ex. 3 | SSP | 0.0005 | " | 13.5 | 1.8 | 10.6 | 7.0 |
| | | 0.005 | " | 13.4 | 1.8 | 12.7 | 4.3 |
| | | 0.05 | " | 12.0 | 1.7 | 11.9 | 4.1 |
| | | 0.5 | " | 13.9 | 2.0 | 11.5 | 4.2 |
| Ex. 4 | PSP | 0.01 | " | 13.3 | 1.7 | 12.5 | 4.4 |
| | ASP | 0.01 | " | 13.6 | 1.9 | 12.6 | 3.9 |
| Ex. 5 | SPP | 0.005 | SMMNS | 13.4 | 2.0 | 12.5 | 4.4 |
| | " | " | SDBNS | 13.3 | 1.8 | 12.6 | 4.1 |
| | " | " | STiPNS | 13.5 | 1.8 | 12.7 | 4.3 |
| | " | " | SMnHNS | 13.2 | 1.9 | 12.3 | 4.0 |
| Comp. Ex. 2 | — | — | SDBNS | 13.4 | 1.8 | 9.5 | 7.6 |
| Ex. 6 | SSP | 0.005 | SMnBNS | 13.2 | 2.5 | 12.5 | 5.9 |
| Com. Ex. 3 | — | — | SMnBNS | 13.1 | 2.6 | 9.2 | 10.8 |

What is claimed is:

1. In a solid electrolytic capacitor which comprises a valve metal member having a dielectric oxide film and a conductive underlying layer formed thereon in this order, and a conductive polymer film which is formed on the conductive underlying layer by electrolytic polymerization of a polymerizable monomer, the improvement characterized in that the electrolytic polymerization is effected in an aqueous solution which comprises the polymerizable monomer, a support electrolyte and a phosphate used in an amount of not less than 0.005 moles/liter.

2. The solid electrolytic capacitor according to claim 1, wherein said polymerizable monomer is pyrrole or its derivative.

3. The solid electrolytic capacitor according to claim 1, wherein said support electrolyte is a naphthalenesulfonate having at least one alkyl substituent having from 1 to 6 carbon atoms.

4. The solid electrolytic capacitor according to claim 1, wherein said conductive underlying layer is made of manganese oxide.

5. The solid electrolytic capacitor according to claim 1, wherein said phosphate is a member selected from the group consisting of sodium, potassium and ammonium primary, secondary and tertiary phosphates and mixtures thereof.

6. A method for fabricating a solid electrolytic capacitor which comprises providing a valve metal member having a dielectric oxide film and a conductive underlying layer formed thereon, and subjecting the valve metal member to electrolytic polymerization in an aqueous solution which comprises a polymerizable monomer, a support electrolyte and a phosphate to form a conductive polymer film on the conductive underlying layer whereby phosphate ions dissociated from the phosphate are adsorbed on the dielectric oxide film.

7. The method according to claim 6, wherein the phosphate is used in an amount of not less than 0.005 moles/liter of the aqueous solution.

* * * * *